UNITED STATES PATENT OFFICE.

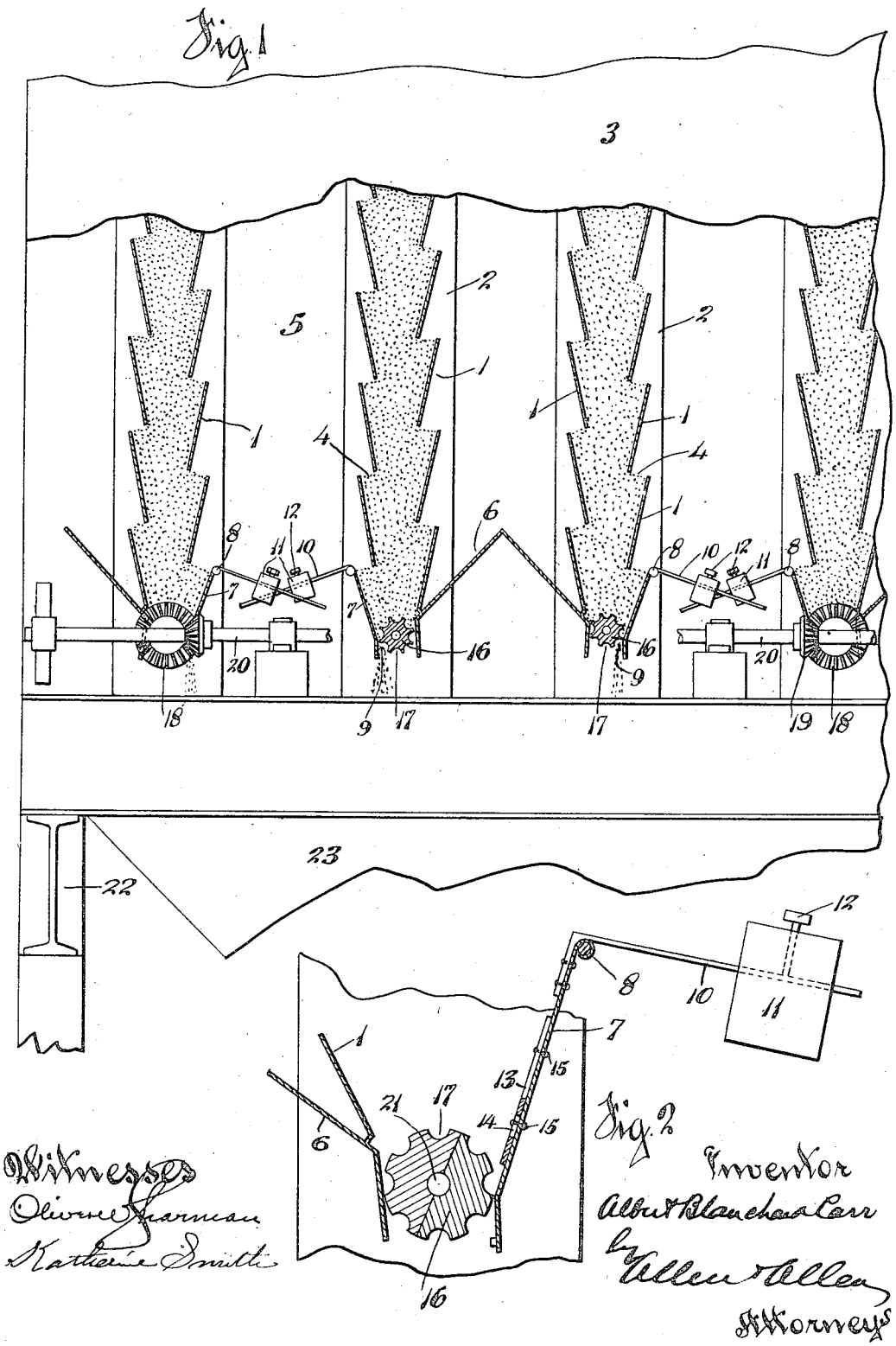

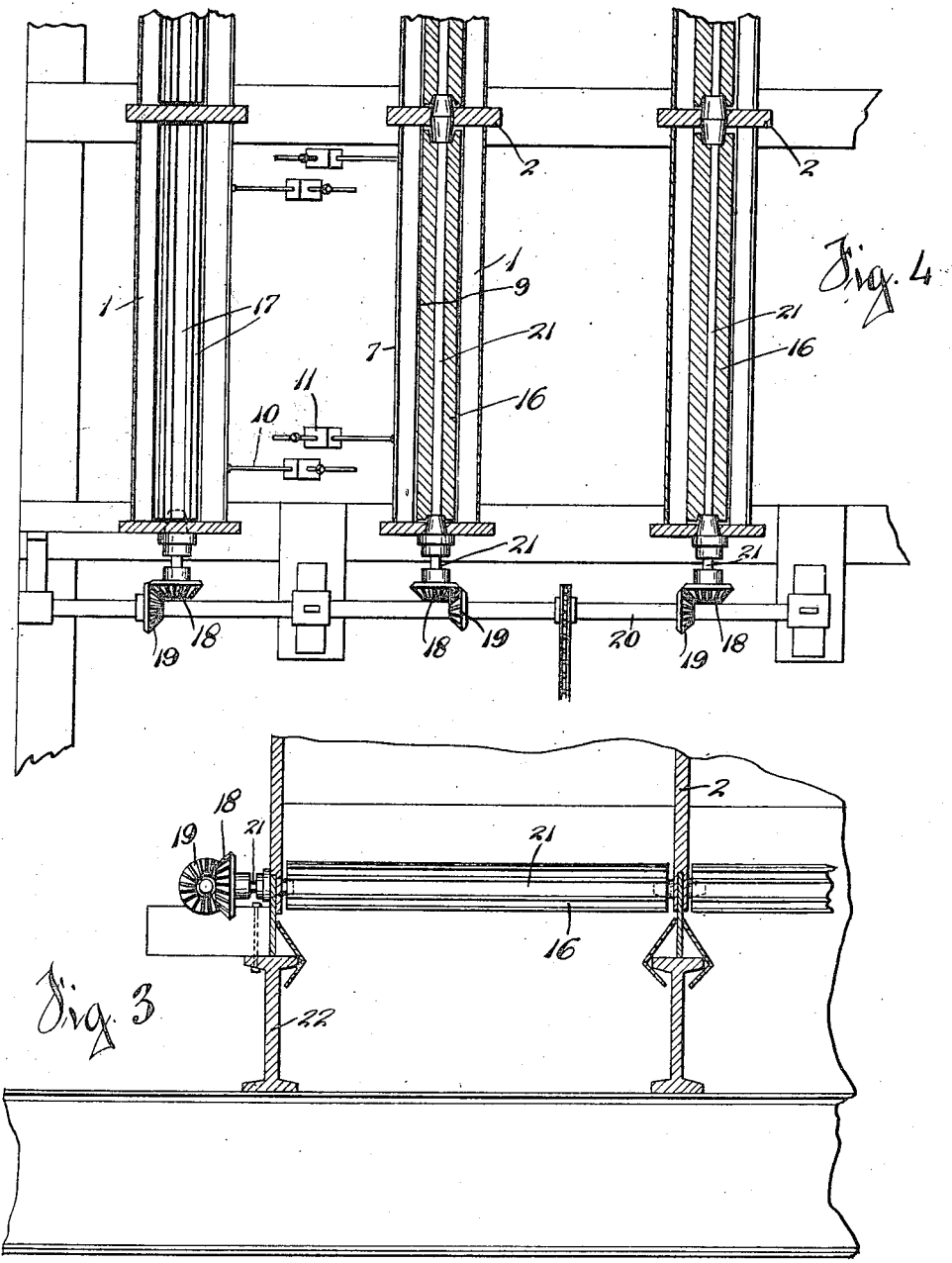

ALBERT BLANCHARD CARR, OF ATLANTA, GEORGIA, ASSIGNOR TO THE PROCTER AND GAMBLE COMPANY, OF CINCINNATI, OHIO, A CORPORATION OF OHIO.

COTTON-SEED DRIER.

1,150,996.　　　Specification of Letters Patent.　　Patented Aug. 24, 1915.

Application filed January 5, 1914.　Serial No. 810,352.

*To all whom it may concern:*

Be it known that I, ALBERT BLANCHARD CARR, a citizen of the United States, and a resident of the city of Atlanta, in the county of Fulton and State of Georgia, have invented certain new and useful Improvements in Cotton-Seed Driers, of which the following is a full, clear, and exact description, reference being had to the accompanying drawings, forming part of this specification.

It has been found that in the art of drying cotton-seed, the ordinary grain driers are inefficient. Among other things which render their use inefficient in such drying, is the fact that cotton-seed will arch and jam in the outlets of the ordinary drier. Moreover ordinary slides or conveyers for removing seeds from the mouth of a drier, such as are commonly used for grain, would result in a worse jam than if the passage of the seeds was unmolested. A further necessary improvement is the fact that a constant movement of the seed through the racks must be maintained or jamming will occur in the racks.

It is the object of my invention, therefore, to construct a drier, with racks or chutes, formed of opposingly inclined plates, in the outlets whereof a means is provided for removing the seed without clogging or jamming, thereby also maintaining a regulated flow of seed through the drier. This I accomplish by that certain construction and arrangement of parts to be hereinafter specifically pointed out and claimed.

In the drawings, Figure 1 is a vertical section through the drier, with a portion in side elevation. Fig. 2 is an enlarged sectional view on the same line, showing the adjusting means for the lower swinging inclined plates and the feed rolls. Fig. 3 is a cross section of a portion of the drier, showing the feeding rolls. Fig. 4 is a horizontal section of the same.

The various devices employed by me to accomplish my purpose of providing an efficient drier of cottonseed are not the only ones by which the same result can be obtained. They are merely the preferred means, my desire being to combine with a drier a non-jamming device which will deliver the dried material at a speed or in amounts which may be regulated to suit conditions. One is enabled by my invention to accomplish numerous new and useful results in drying. In the first place, cottonseed may be run through a vertical rack drier since means of removing it are supplied. Also, the removing means are located adjacent to swinging plates in the mouths of the racks, thereby avoiding clogging. Again, no seed will fall through the machine unless the rotary devices are operated. The racks may be filled and the delivery device worked at a speed which will cause a regular flow of seed in the racks, which cannot be obtained without this regular flow, as only part of a full rack will slide out if artificial means are not provided, and finally the number of tons per hour in the racks and subject to drying may be readily regulated. Thus I provide a new combination of parts which have extremely useful and novel functions.

The vertical racks are formed (Fig. 1) of a number of staggered series of mutually inclined plates 1, said inclination being toward the bottom of each plate. The ends of the plates are mounted in any desired way in upright end plates 2, or in the side walls 3 of the drier. It will be understood that the number of racks may be multiplied as desired, both lengthwise or crosswise of the machine. The back end plate 2 for one of the crosswise series is employed for the forward end plate of the next rack in the series. By this arrangement, a continuous passage is provided for the seed, said passage being opened at 4 at the top edge of each plate, for the passage of air. In the drawings no means of creating a current of air is shown, but it will be understood that, as is usual, there will be a current of air maintained by means of fans in the chambers 5 between the racks, which said air will strike and circulate in and around the seed through the open spaces 4 in the racks. Angular bottom pieces 6 are provided to close the racks and chambers from the outer air.

One of the inclined plates 7 at the bottom end of each rack, which forms a mouth together with its adjacent plate for the racks, is swung on a rod 8 which runs crosswise of the drier. The outside arms 10 of these plates are provided with slidable weights 11 to maintain them normally in contact with the rotary delivery device to be hereinafter described. The weights 11 are provided with set screws 12 for adjustment on the arms.

In the preferred construction of swinging plate (shown only in the enlargement in Fig. 2) there is provided a sliding plate 13 on the inner surface of the plate 7. Slots 14 in these plates permit of adjustment of them on bolts 15 in the plates 7 to bring their lower edge nearer or farther from the periphery of the feed roll. The space between this lower edge and the roll will regulate the amount of feed. The rolls 16, having longitudinal pockets or corrugations 17, are mounted so as to revolve in the mouths 9 of the racks constructed as above described. The direction of revolution is against the swinging plate and the pockets 17 in the rolls will carry down out of the racks a quantity of the seed. Beveled gears 18 are mounted on the shafts 21 of these rolls and are engaged by beveled pinions 19 mounted on a shaft 20 which is journaled along the side of the machine in such a position that these gears will mesh. Rotation in either direction may be accomplished by varying the positions of the pinions to right or left of the gears 18. The shafts 21 extend clear across the machine to accommodate as many chutes as may be used crosswise the drier.

The machine is shown as bolted or clamped on I-beams 22, and as having a large hopper 23 for the final discharge of all racks. Regulation of flow in the racks is accomplished by speed of rolls, adjustment of weights 11 and of the sliding face plate 13.

Having thus described my invention, what I claim as new and desire to secure by Letters Patent, is:—

1. A cotton-seed drier, comprising a vertical rack formed of plates mutually inclined toward each other, a feed roller between the two bottom plates of the rack and means whereby the bottom plate on one side will swing outwardly to accommodate the action of the feed roller.

2. A cotton-seed drier, comprising a vertical rack formed of plates mutually inclined toward each other, a roll with pockets in the periphery thereof to rotate between the two bottom plates and in contact therewith, and means whereby one of said plates will swing outwardly from the roll to accommodate the action thereof.

3. A cotton-seed drier, comprising a vertical rack formed of plates mutually inclined toward each other, a roll with pockets in the periphery thereof to rotate between the two bottom plates and in contact therewith, means for pivoting one of the bottom plates so as to swing and means whereby the swinging plate is normally held against the roll.

4. A cotton-seed drier, comprising a vertical rack formed of plates mutually inclined toward each other, a roll with pockets in the periphery thereof to rotate between the two bottom plates and in contact therewith, means for pivoting one of the bottom plates so as to swing, means whereby the swinging plate is normally held against the roll and an adjustable face plate on said swinging plate, for the purpose described.

5. A cotton-seed drier, comprising a series of narrow vertical racks formed of mutually inclined plates supported at their ends and open at the sides and a feed roller between the two bottom plates of each rack, for the purpose described.

6. In a drier for cottonseed, a series of vertical racks formed of mutually inclined plates, and means located within each rack for ejecting therefrom a continuous flow of the material to be dried and means whereby one of the inclined plates will swing outwardly to accommodate the action of the ejecting means.

7. In a drier for cottonseed, a series of vertical racks formed of mutually inclined plates, and means located within each rack for ejecting therefrom a continuous and regulated flow of the material to be dried and means whereby one of the inclined plates will swing outwardly to accommodate the action of the ejecting means.

ALBERT BLANCHARD CARR.

Attest:
 DAN GOEPPER,
 H. H. ASHER.